United States Patent
Zhao et al.

(10) Patent No.: US 9,747,281 B2
(45) Date of Patent: Aug. 29, 2017

(54) GENERATING MULTI-LANGUAGE SOCIAL NETWORK USER PROFILES BY TRANSLATION

(71) Applicant: LinkedIn Corporation, Mountain View, CA (US)

(72) Inventors: Bing Zhao, Sunnyvale, CA (US); Pi-Chuan Chang, Mountain View, CA (US); Tianhua Duan, Mountain View, CA (US); Daniel Bikel, Saragota, CA (US); Ada Yu, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/961,266

(22) Filed: Dec. 7, 2015

(65) Prior Publication Data
US 2017/0161264 A1 Jun. 8, 2017

(51) Int. Cl.
*G06F 17/28* (2006.01)
*G06Q 50/00* (2012.01)

(52) U.S. Cl.
CPC ......... *G06F 17/2809* (2013.01); *G06Q 50/01* (2013.01)

(58) Field of Classification Search
CPC . G06F 17/289; G06F 17/2836; G06F 17/2854
See application file for complete search history.

(56) References Cited

U.S. PATENT DOCUMENTS

| | | | | |
|---|---|---|---|---|
| 7,295,964 B2* | 11/2007 | Suzuki | ................ | G06F 17/2872 704/2 |
| 7,359,849 B2* | 4/2008 | Palmquist | ............... | G10L 15/26 704/4 |
| 8,630,840 B1* | 1/2014 | Smith | ................... | G06F 17/289 370/260 |
| 8,855,995 B1* | 10/2014 | Macherey | ............. | G06F 17/289 704/2 |
| 2002/0174196 A1* | 11/2002 | Donohoe | .......... | G06F 17/30905 709/219 |
| 2003/0125927 A1* | 7/2003 | Seme | .................... | G06F 17/289 704/3 |
| 2003/0191626 A1* | 10/2003 | Al-Onaizan | ........ | G06F 17/2223 704/8 |
| 2004/0030542 A1* | 2/2004 | Fuji | ..................... | G06F 17/2836 704/2 |

(Continued)

OTHER PUBLICATIONS

Amanda, "New on Geni: Multilingual Profiles", Online, from http://www.geni.com/blog, posted on Sep. 22, 2014.*

(Continued)

*Primary Examiner* — Jialong He
(74) *Attorney, Agent, or Firm* — Hickman Palermo Becker Bingham LLP; Daniel D. Ledesma (57) ABSTRACT

Techniques are provided to allow users of a social network to have multilingual profiles (or profiles in second languages that are different than the users' native, or original, profile languages). In one technique, a translation model is applied to one or more data items (in a first language) in a user's profile to generate translated data items in a second language. The translated data items are displayed to the user (or an online social "friend" of the user) and the user is allowed to select one of the translated data items to include in the user's "second language" profile. The selection may then be used to improve the translation model.

21 Claims, 5 Drawing Sheets

(56) References Cited

U.S. PATENT DOCUMENTS

| | | | |
|---|---|---|---|
| 2005/0049851 A1 | 3/2005 | Watanabe | |
| 2005/0055217 A1* | 3/2005 | Sumita | G06F 17/2827 704/277 |
| 2005/0216253 A1 | 9/2005 | Brockett | |
| 2006/0116865 A1* | 6/2006 | Cheng | G06F 17/2836 704/2 |
| 2007/0173326 A1* | 7/2007 | Jennings | A63F 13/79 463/42 |
| 2007/0294076 A1* | 12/2007 | Shore | G06F 17/2836 704/2 |
| 2008/0306728 A1* | 12/2008 | Kamatani | G06F 17/2818 704/7 |
| 2009/0198487 A1* | 8/2009 | Wong | G06F 17/28 704/4 |
| 2010/0082324 A1 | 4/2010 | Itagaki | |
| 2010/0223048 A1* | 9/2010 | Lauder | G06F 17/2836 704/4 |
| 2010/0299132 A1 | 11/2010 | Dolan | |
| 2011/0138171 A1* | 6/2011 | Yildiz | H04L 67/306 713/153 |
| 2012/0109631 A1* | 5/2012 | Gopal | G06F 17/3089 704/3 |
| 2012/0323554 A1 | 12/2012 | Hopkins | |
| 2013/0036180 A1* | 2/2013 | Deren | G06F 17/289 709/206 |
| 2013/0144594 A1* | 6/2013 | Bangalore | G06F 17/2836 704/2 |
| 2014/0142917 A1* | 5/2014 | D'Penha | G06F 17/2836 704/2 |
| 2016/0103825 A1 | 4/2016 | Ehsani | |
| 2016/0350285 A1 | 12/2016 | Zhao et al. | |
| 2016/0350289 A1 | 12/2016 | Zhao et al. | |

OTHER PUBLICATIONS

Serdula, "LinkedIn profile examples", online, retrieved from www.archive.org, archived on Mar. 21, 2015.*

Zhao, U.S. Appl. No. 14/820,466, filed Aug. 6, 2015, Restriction Requiremend, Jan. 3, 2017.

U.S. Appl. No. 14/820,472, filed Aug. 6, 2015, Office Action, dated Jan. 10, 2017.

* cited by examiner

GENERATING MULTI-LANGUAGE SOCIAL NETWORK USER PROFILES BY TRANSLATION

CROSS-REFERENCE TO RELATED APPLICATIONS; BENEFIT CLAIM

This application is related to U.S. patent application Ser. Nos. 14/820,466 and 14/820,472, both filed Aug. 6, 2015, the entire contents of each of which is hereby incorporated by reference for all purposes as if fully set forth herein.

TECHNICAL FIELD

The present disclosure relates to translating content and, more particular to, translating user content for public consumption.

BACKGROUND

Online social network providers allow users to register and connect with other users who share some common characteristic, such as professional interests, music interests, or general sharing of personal information. Typical social networks allow users to create profiles that other users are able to view.

As social networks expand and begin to include people with different language abilities, language differences can become an issue. This is exacerbated by the fact that many users only create a single profile in a single language. For example, an English-speaking user creates a profile in English but would greatly benefit from Chinese-speaking employers who could user the English-speaking user's skills. Without being able to read the profile of the English-speaking user, the Chinese-speaking employers will not consider the English-speaking user as a candidate.

Indeed, profiles can be the most important metadata in relevance products/services, such as recruiter search, job recommendations, and content relevance. Without an accurate profile in a second language, the ability to leverage or increase one's social network is severely diminished.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided to allow users of a social network to have multilingual profiles (or profiles in second languages that are different than the users' native, or original, profile languages). In one technique, a translation model is applied to one or more data items (in a first language) in a user's profile to generate translated data items in a second language. The translated data items are displayed to the user and the user is allowed to select one of the translated data items to include in the user's "second profile." The selection may then be used to improve the translation model.

Techniques described herein use one or more translation models to spur digital content creation for public or semi-public consumption.

System Overview

Figure 1:
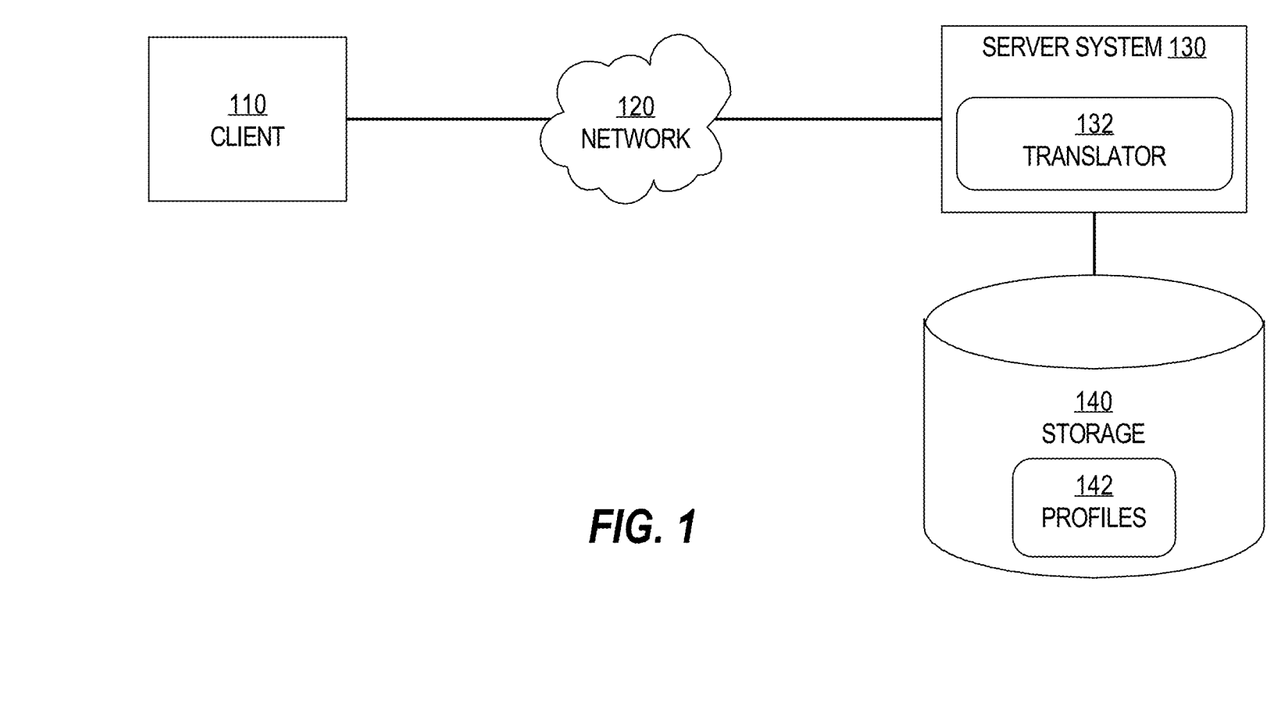
FIG. 1 is a block diagram that depicts a system for translating user profiles, in an embodiment.

FIG. 1 is a block diagram that depicts a system 100 for translating user profiles, in an embodiment. System 100 includes client 110, network 120, server system 130, and storage 140.

Client 110 is an application or computing device that is configured to communicate with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server 130 over network 120. Another example of an application is a web application that is downloaded from server system 130 and that executes within a web browser executing on a computing device. Client 110 may be implemented in hardware, software, or a combination of hardware and software. Although only a single client 110 is depicted, system 100 may include multiple clients that interact with server system 130 over network 120.

Through client 110, a user is able to provide input that includes (monoilingual or multilingual) information about the user. Later, the user may interact with server 130 to retrieve, supplement, and/or update the information.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Storage 140 stores a profiles 142 of multiple entities, such as users and organizations. Storage 140 may comprise persistent storage and/or volatile storage. Storage 140 may comprise multiple storage devices. Also, although depicted separately from server system 130, storage 140 may be part of server system 130 or may be accessed by server system 130 over a local network, a wide area network, or the Internet.

Server System

In an embodiment, server system 130 maintains accounts for multiple users. Server system 130 may provide a web service, such as a social networking service. Examples of social networking service include Facebook, LinkedIn, and Google+. Although depicted as a single element, server system 130 may comprise multiple computing elements or devices, connected in a local network or distributed regionally or globally across many networks, such as the Internet. Thus, server system 130 may comprise multiple computing elements other than translator 132.

Translator 132 translates one or more profiles in profiles 142 from one language (e.g., English) to another language (e.g., Chinese), thus creating one or more "second language" profiles. Machine translation is a sub-field of computational linguistics that investigates the use of software to translate text or speech from one language to another. On a basic level, machine translation performs simple substitution of words in one language for words in another language.

Statistical machine translation, a sub-field of machine translation, generates translations using statistical methods based on a bilingual (or multilingual) text corpus. In statistical machine translation, a document is translated according to the probability distribution $p(e|f)$ that a string e in a target language (e.g., English) is the translation of a string f in the source language (e.g., French). The problem of modeling the probability distribution $p(e|f)$ may be approached in a number of ways. In one approach, Bayes Theorem is applied, that is $p(e|f) \propto p(f|e)p(e)$, where the translation model $p(f|e)$ is the probability that the source string is the translation of the target string, and the language model $p(e)$ is the probability of seeing that target language string. This decomposition is advantageous as it splits the problem into two subproblems. Finding the best translation $\tilde{e}$ is done by picking up the one that gives the highest probability:

$$\tilde{e} = \mathrm{argmax} p(e|f) = \mathrm{argmax} p(f|e)p(e)$$

where e∈e*

For a rigorous implementation of this formula, an exhaustive search would have to be performed by going through all strings e* in the native language. A machine translation decoder that uses the foreign string, heuristics, and other methods to limit the search space may be used to perform the search efficiently and at the same time keep acceptable quality. If the language model $p(e)$ is limited to a certain domain (or type of information), such as user profiles and/or job information, then the size of e* may not be substantial enough to slow down the translation process.

In an embodiment, translator 132 is implemented by a single translation model. The single translation model may support the translation of words or characters in one language into words or characters in multiple languages.

In a related embodiment, server system 130 supports multiple translation models, each associated with a different pair of languages. For example, one translation model is for translating English to Spanish and vice versa, another translation model is for translating English to Chinese and vice versa, and another translation model is for translating French to German and vice versa. Therefore, there may be multiple translators (not depicted) or translator 132 may be considered a set of multiple translation models.

In a related embodiment, server system 130 supports multiple translation models, each associated with a different information type. For example, one translation model is for translating job titles and another translation model is for translating employer names. Each of the translation models may be associated with the same pair of languages (e.g., English and Chinese). Thus, if the information type of source text is known, then the appropriate language model is identified. Additionally or alternatively, a single translation model may be based on multiple information types.

A translation model may be based on one or more sources. For example, a translation model may be trained using multi-lingual transcripts from meetings at the United Nations. As another example, a translation model may be trained based on cognates identified based on analyzing multiple user profiles in a social network. In this approach, server system includes a cognate identifier (not depicted) that identifies multilingual cognates from multiple user profiles. Techniques for identifying multilingual cognates and using them to train a translation model are described in U.S. patent application Ser. Nos. 14/820,466 and 14/820,472, which are incorporated herein by reference as if fully disclosed herein.

User Profiles

A user's profile includes multiple data items, such as first name, last name, email address, residence information, mailing address, phone number, one or more educational institutions attended, one or more current and/or previous employers, one or more current and/or previous job titles, a list of skills, a work summary, a job summary, a list of endorsements, and interests or hobbies. Some data items within a user's profile (e.g., work history) may be provided by the user while other data items within the user's profile (e.g., skills and endorsement) may be provided by a third party, such as a "friend" or connection of the user or a colleague of the user.

A profile may be just one part of a user's account. An account may also include names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network.

Before profiles in profiles 142 are analyzed, server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Determining One or More Languages Associated with a Single Profile

A user profile comprises multiple (e.g., text) fields. Example fields include job title, employer name, field of study, name of an academic institution attended, name of a degree awarded by the academic institution, an industry name (e.g., "Finance" or "Law"), and headline (or moniker) possibly indicating a characteristic of the user (e.g., "Code Ninja"). This set of information is referred to herein as "top-card information." Each field is associated with a name for the type of information that is provided to that field. For example, a job title field is associated with the name "job title." Thus, after user enters a job title in the job title field and submits that and other top-card information, server system 130 stores the entered job title with a field label or other metadata, such as "job title."

Server system 130 determines a language of a profile in one of multiple ways. For example, a user that provided profile information manually specifies a language of the profile. Such input may be specified during registration with server system 130 or sometime after registration, such as after a successful login attempt. Specifying a language may comprise the user selecting a language from a list of languages in a drop-down menu that is displayed adjacent to user-provided profile information that is in one language. Server system 130 then stores, in association with the profile, data that identifies the user-selected language.

Additionally or alternatively, server system 130 automatically determines the language of a profile (i.e., without user input that identifies the language). For example, for each of one or more fields of a profile (e.g., a job title or employer name), server system 130 compares user-provided text of that field with a text corpus of known languages (e.g., English, Spanish, French, German, and Chinese). If the user-provided text matches text from a text corpus of a particular language, then server system 130 stores, in association with the profile, language identification data that identifies the particular language. One example of a text corpus is a set of user profiles where the languages are known or have already been determined, whether determined automatically or determined based on user input that specifies the respective languages.

In an embodiment, a user profile comprises multiple language-specific profiles, where each language-specific profile comprises the same (or similar) top-card information, but in a language that is different than each other language-specific profile in the same user profile. For example, after a user fills out top-card information in one language (which server system 130 may not know at the time the top-card information is provided by the user), the user provides input (e.g., selecting a particular graphical button) that indicates that the user desires to enter the top-card information in another language, after which the user provides that top-card information. As another example, translator 132 translates top-card information of the user's (e.g., initial) language-specific profile to automatically create a second language-specific profile for the user. Whether top-card information in a second language is created manually or automatically, server system 130 stores each set of top-card information as a language-specific profile of the user's profile.

Example Process

Figure 2:
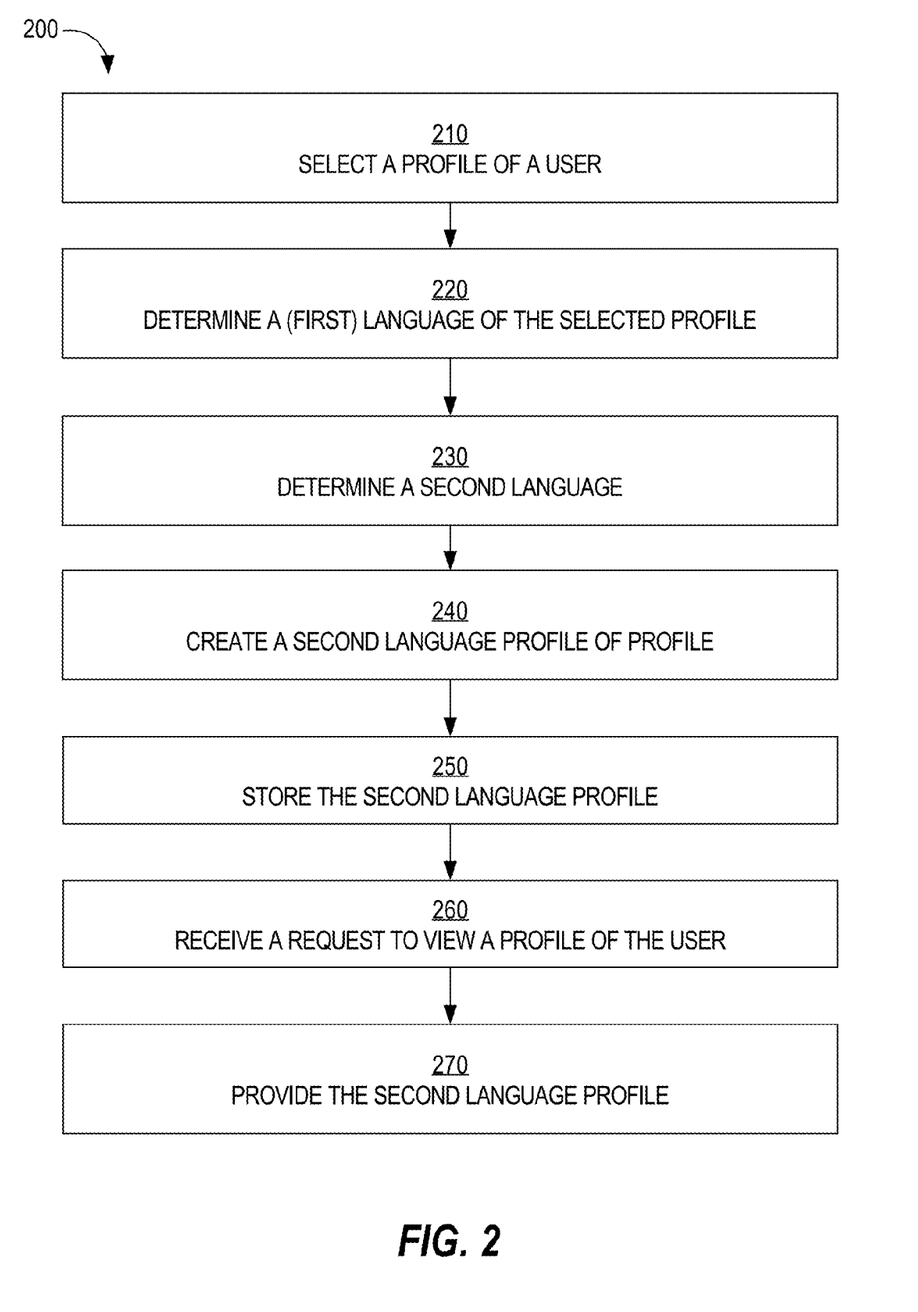
FIG. 2 is a flow diagram that depicts a process for creating a second language profile for a user, in an embodiment.

FIG. 2 is a flow diagram that depicts a process 200 for creating a second language profile for a user, in an embodiment.

At block 210, a profile from profiles 142 is selected. The selection may be performed randomly or in an ordered fashion. For example, process 200 is repeated for each profile (in profiles 142) that does not already have a second language profile.

At block 220, a (first) language of the selected profile is determined.

At block 230, a second language is determined. For example, process 200 is repeated for each profile (in profiles 142) that does not have an English language profile. In this example, the second language is English and block 230 is only performed if the first language is not English.

At block 240, translator 132 creates a second language profile based on the selected profile. Block 240 may involve selecting a translation model from among multiple translation models (if they exist) where the selected translation model is used to translate words/characters from the first language to the second language.

At block 250, the second language profile is stored in association with the selected (first language) profile of block 210. For example, the second language profile is stored persistently among profiles 142 in storage 140.

At block 260, a request to view a profile of the user that corresponds to the selected profile is received. The request may be a generic request for any profile or a request for a specific profile, such as the second language profile. The request may be a HTTP request that is transmitted from client 110 over network 120 to server system 130.

In a related embodiment, block 260 precedes block 210 in that the user who desires to have her profile translated initiates process 200 as it pertains to blocks 210-250. Thus, user input causes the second language profile to be generated.

At block 270, the second language profile is provided in response to the request. For example, the second language profile (or a link to the second language profile) is sent over network 120 to client 110 for display on a screen of client 110. Block 270 may be performed in response to the user selecting a GUI element (e.g., a button or a link) in a web page that includes the first language profile of the user. The GUI element may include text that refers to the second language profile and may specify the language (e.g., Chinese) of the second language profile.

Instead of the request in block 260 coming from the user whose profile is being translated, the request may be from another user. In this scenario, block 270 involves first determining a language of the user initiating the request and selecting the second language profile from among multiple language-specific profiles to provide. The requesting user may be associated with the second language either through a language preference specified by the requesting user (e.g., in a profile or account of the requesting user). Alternatively, the second language may be determined by server system 130 based on an analysis of the requesting user's profile language, browsing history, blogging history, and/or comment history. For example, if it is determined that the requesting user requests content items that are primarily in Spanish, then a Spanish language profile is presented to the requesting user.

In a related embodiment, a requesting user is only allowed to view another user's second language profile if the other user has provided, to server system 130, input that indicates that the user is satisfied with the translation and desires to have the translated data items retained in association with the user. The input may be single user input that is indicates that the entire second language profile should be retained (even if there are multiple translated data items). Alternatively, different input is required for each translated data item; for example, one confirmation input for the user's name, another confirmation input for the user's job title, etc. In response to the indication, the translation model (that was used to perform the translation) may be updated so that future translations of the same or similar profile data item(s).

Figure 3A:
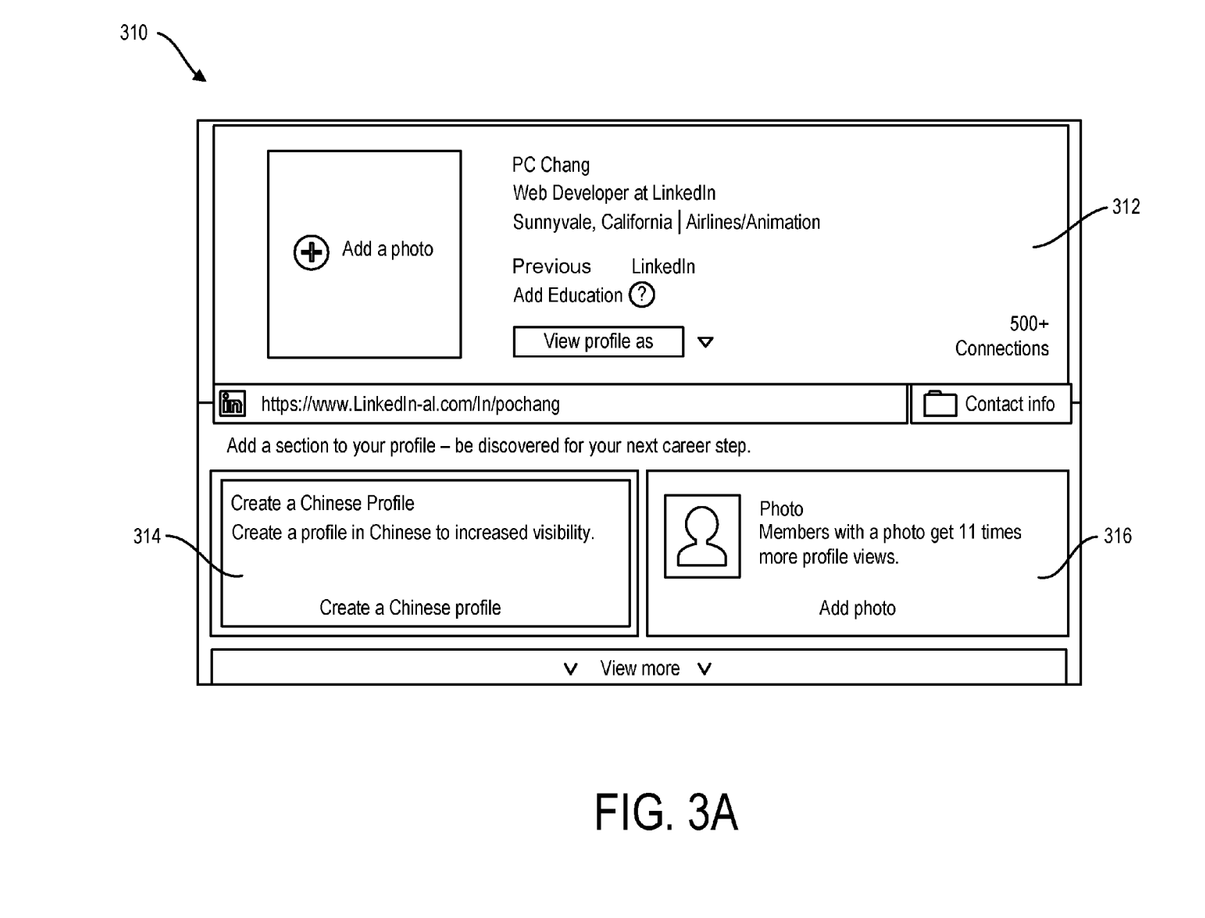
FIGS. 3A-3B are screenshots of example user interfaces that allow a user to view a second language profile, in an embodiment.
Figure 3B:
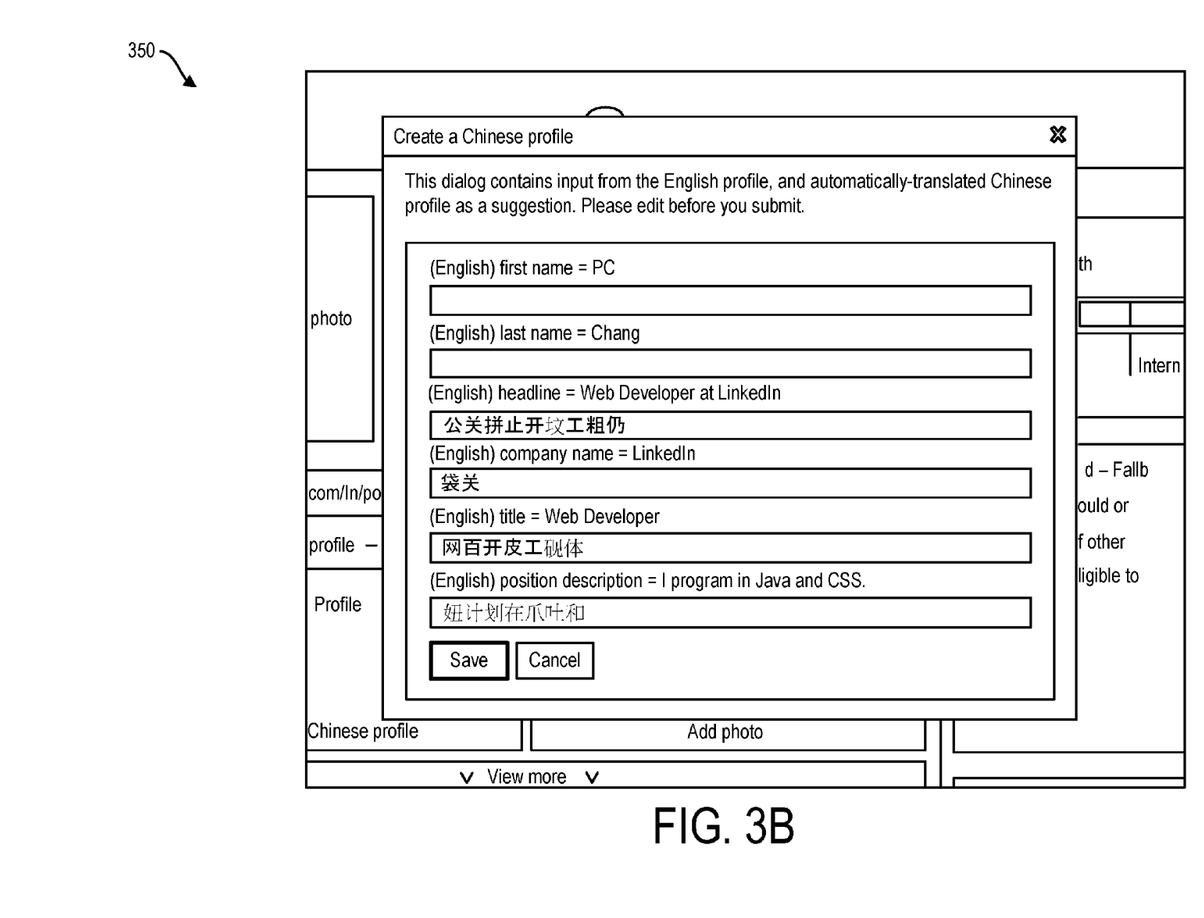

FIGS. 3A-3B are screenshots of example user interfaces that allow a user to view a second language profile, in an embodiment. As noted previously, the second language profile may be created prior to the request from the user or in response to the request. User interface 310 includes a top card section 312, a second language profile section 314, and a photo invitation section 316. Top card section 312 includes, in English, the user's name, headline (i.e., "Web Developer at LinkedIn"), and location information (i.e., "Sunnyvale, Calif."). Second language profile section 314 includes text that prompts the user to initiate creation of a Chinese version of the English language profile. While the text implies that the Chinese profile has not yet been created, translator 132 may have already created the Chinese profile and stored the Chinese profile in association with the English profile. Selection of section 314 (or the hyperlinked text "Create a Chinese Profile") causes user interface 350 to be generated and displayed to the user.

User interface 350 includes six data items in English and six entries for translated data items (if any) in Chinese. Each translated data item is displayed adjacent to the corresponding original data item. For example, the English job title is "Web Developer" and the translated version thereof is a series of seven Chinese characters that appear immediately below the English job title. In another scenario, Post Edits In an embodiment, after a second language profile is created for, and displayed to, a target user, server system 130 provides a user interface with one or more UI controls that allow the target user to edit the second language profile, such as deleting a translation (or translated data item), amending a translation, and adding a translation. A target user may add a translation for a data item for which translator 132 provided no translation (e.g., because a confidence score for a candidate translation of the data item was not above a particular confidence threshold). The user interface may also include information about each translated data item, such as a confidence score, a source from which the translated data item originated, and/or how often other users (e.g., those who had the same original data item as the present user) of server system 130 have accepted the translated data item as accurate.

In an embodiment, a target user provides input that classifies a translated data item. Example classifications include typo, abbreviation, acronym, transliteration, and ambiguous. If the target user is familiar enough with the second language, then the target user can classify a translated data item, which classification can help translator 132 (or a translation model that was used to generate the translated data item) improve its accuracy in the future. Even input that simply rejects a translated data item (i.e., without classifying the translated data item) may be used as an indication not to use the translated data item in the future.

For example, if 50% of target users who view a translated data item classify the translated data item as ambiguous, then translator 132 may prevent that translated data item from being displayed to target users as a possible translation in the future. Alternatively, that user feedback may be used by translator 132 to generate a confidence score for the translated data item, which, if the user feedback is negative, will cause the confidence score to decrease.

For example, a binary classification may be used to predict a "thumbs up" (positive) or "thumbs down" (negative) judgment. The binary classification outputs a score (e.g., a float number) that is then combined with the previous confidence score (as simple as average) to generate a final adjusted confidence score. With a single adjusted confidence score, the search space (or N-best hypotheses) is re-ranked and a better/alternative translation can be shown to the user. As a related example, each error type is associated with a different classifier. For example, one classifier is trained for typos (or misspellings) and another classifier is generated for ambiguous. Then, for each candidate translation, each error-type classifier outputs a score that indicates how likely that candidate translation reflects the type of error that corresponds to the score-generating classifier. The multiple scores generated for the candidate translation are analyzed to determine which type of error is reflected in the candidate translation. A user interface may indicate, for a single candidate translation, the type of error that is most likely reflected in the candidate translation. Additionally, the user interface may indicate that multiple types of errors are reflected in the candidate translation.

An error type for a candidate translation may be indicated in one of multiple ways, such as numbers, a text (or character) description, and/or colors. For example, each error type may be associated with a different color; for example, green for typo, red for ambiguous, and blue for acronym.

User feedback that classifies a translation may be used to update a translation model directly or a classifier that learns which translations are incorrect. The classifier may be integrated as part of translator 132 (e.g., a machine translation engine) or as a separate component that receives one or more candidate translations of a particular data item and scores the candidate translations(s) based on prior user feedback.

In an embodiment, information related to the user of the translated profile data item is used to help train or update translator 132, such as a classifier within translator 132. For example, a first user may change the acronym "UCF" (presented to the first user) into "University of Central Florida" while a second user may change that same acronym into "University College Falmouth" which is an academic institution in the United Kingdom. When each edit is received, information about each user is retrieved, such as the user's profile and/or IP address of the client device that each user is using to connect to server system 130. A geographical location may be determined based on the IP address. Later, when UCF is determined to be a candidate translation for a third user, translator 132 determines, based on information about the third user (e.g., IP address), that UCF should be spelled out to "University of Central Florida" since both the first user and the third user are associated with information (e.g., IP address, address of a current/former employer, etc.) that indicates that they reside (or have resided) in the United States or, more particularly, in the state of Florida.

Confirming Users

In an embodiment, the target user is provided an interface that allows the target user to select one or more other users of server system 130 (or people unaffiliated with server system 130) and send requests to the selected users for confirmation of one or more of the translations. Such users are referred to herein as "confirming users." The confirming user may be pre-selected by server system 130. Example criteria for selection as a confirming user is that the confirming user is a "friend" or direct connection with the target user that is seeking confirmation and that the confirming user is associated with the language of the second language profile and, optionally, also associated with the language of the first language profile. For example, user A has a profile in French and is friends with user B who has a profile in English. When user A is presented with a second language profile in English, user A is provided the option to communicate with user B about one or more data items in user A's second language profile. If user B also has a language-specific profile in French, then user B is even a closer match.

A confirming user may be known to be associated with the second language in one of multiple ways. For example, the confirming user may be associated with the second language due to the fact that the confirming user has specified the second language as a known language and that preference is stored in association with an account or profile (maintained by server system 130) of the confirming user. As another example, the confirming user may have a profile in the second language. The profile may be known to be the initial profile of the confirming user or at least that the confirming user provided the direct input for one or more data items in the profile.

In an embodiment, a user interface that is displayed to a target user includes a GUI element that identifies (or is otherwise associated with) a confirming user. In response to the target user selecting the GUI element, server system 130 causes a message to be automatically generated and sent to the confirming user, such as through email, text message, or a messaging service provided by server system 130, such as a messaging service that is integrated with a profile management service that allows users to create and edit their respective profiles. The target user may be allowed to modify or customize the message. The automatically-generated message may include both a translated data item and the original data item (from which the translated data item was generated). In this way, the confirming user can see both data items to be better able to make an assessment regarding whether the translation is accurate. Additionally, the automatically-generated message may include the entire second language profile (or a portion thereof) and, optionally, the corresponding first language profile.

Additionally or alternatively to an automatically-generated message, server system 130 provides a user interface to the confirming user, such as when the confirming user logs into server system 130. A home page or profile page of the confirming user may include a textual or graphical notification that a friend or connection is requesting confirmation of a translation. Selection of the notification causes the user interface to be displayed. The user interface may be integrated with the confirming user's home page or profile page. In this way, it does not appear to the confirming user that she is leaving her home or profile page. The user interface may allow the confirming user to give a simple "Yes" or "No" to each translated data item and/or modify a translated data item.

In an embodiment, a user interface that is presented to a confirming user includes (a) only machine-translated data items and the corresponding source data items, (b) only source data items for which no machine-translated data items were made or, if made, are not presented, or both (a) and (b). Also, the user interface may allow the confirming user to only confirm, edit, and/or add certain translated data items, such as top-card information. Alternatively, the user interface, at least in the (b) scenario, allows the confirming user to specify or input the translations through text input or voice input.

In an embodiment, edits by a confirming user are used to update a translation model or train a classifier, similar to (or the same as) the technique described previously under the "POST EDITS" section. A translation model may be updated even though the target user does not accept the confirming user's translation of a profile data item.

After the confirming user makes one or more translations of one or more profile data items of the target user, a user interface is presented to the target user indicating one or more profile data items and one or more corresponding translated data items. The user interface may include a one or more GUI elements adjacent to each translated data item that allows the target user to accept or reject the translated data item.

Second Language Profile Accessibility

If a target user is satisfied or confident in the translations (or corrections thereof), then the target user provides input that causes the translations to be saved, which may involve making the translations "public." For example, the target user selects the "Save" button 360 in FIG. 3B. In that example, selection of button 360 causes the Chinese language profile to be visible to other users, such as users that have established connections with (or are "friends" with) the target user, or all users who are already allowed to view the original English language profile.

In an embodiment, single user input (e.g., a click of a mouse or a touch to a screen) causes multiple (e.g., all) translated data items to be saved as a user's second language profile. Alternatively, the user has an option to individually confirm each translated data item. Thus, a user may confirm a strict subset of multiple translated data items (i.e., for different source data items), such as three out of five.

In an embodiment, a second language profile has the same accessibility as the first language profile. For example, if a first language profile can be viewed by everyone, including people who are not registered with server system 130, then the second language profile is also viewable by everyone. As another example, if a work history portion of a first language profile can only be viewed by direct (or "first degree") connections of a target user, then the work history portion (if created) of a second language profile can only be viewed by direct connections of the target user.

In a related embodiment, a second language profile is only visible (i.e., another user is able to send a request to view the second language profile) to users who are determined to be familiar with the language of the second language profile. For example, if a second language profile is in Chinese, then only registered users (of server system 130) who have indicated that they know Chinese are able to view the second language profile. Such other users may be identified based on specified language preferences, a language of their first language profile (e.g., also Chinese in this example), or a number of first degree connections who are known (or likely) to be Chinese readers.

Selecting a Language-Specific Profile for Display

In social networks, a first user is allowed to view a profile of a second user. As noted previously, the profile of a user may be public, private (in that only a restricted number of users who users with a certain relationship to the user are able to view the profile), or semi-private. If the second user has multiple language-specific profiles, then server system 130 determines which language-specific profile to display to the first user.

For example, a first user specifies one or more search criteria for a search that server system 130 performs to identify one or more profiles that satisfy the search criteria (e.g., "Car Mechanic"; Dallas, Tex.). If multiple user profiles satisfy the search criteria, then information from each user profile is displayed, such as first and last names, location, job title, and work history. If one of the user profiles satisfies the search criteria and that profile is associated with multiple language-specific profiles, then one or more criteria are used to determine which language-specific profile to use to display results of the search.

Example criteria include whether one of the language-specific profiles is the default profile, which language-specific profile was created first, whether the first user has specified a language preference in the search query or in a profile (e.g., maintained by server system 130) of the first user, or which language server system 130 has determined to be most relevant to the first user, such as determining the language of the first user's initial profile based on analysis of data items in that profile.

In an embodiment, the first user's search criteria (which is in a source language) is translated into a target language, the translated search criteria is compared to language-specific profiles that are in the target language, a matching language-specific profile is identified and translated into the source language, and the translation (or portion thereof) is presented to the first user as a result of the search. Alternatively, the first user's search criteria (which is in a source language) is compared to language-specific profiles in the source language, a matching language-specific profile of a second user is identified, another language-specific specific profile of the second user is identified, and a portion of that other language specific profile is provided to the first user as results of the search.

Candidate Translations

In an embodiment, translator 132 generates multiple candidate translations for a particular data item in a profile. For example, "Product Manager" may be translated into three different German phrases. Each candidate translation may be associated with a confidence score that indicates (a) a level of confidence that the candidate translation is accurate or (b) how often the candidate translation is seen with the original (first language) data item. For example, if "Software Engineer" is a translation of "la ingeniero de programas" 40% of the time that "la ingeniero de programas" occurs in a data set of translation pairs, then the confidence score is 40%. The confidence scores of a set of candidate translations may be used to determine which candidate translations to display to a target user and/or an order in which to display the set of candidate translations. For example, if the set of candidate translations are ordered vertically, then the candidate translation with the highest confidence score is placed at the top while the candidate translation with the lowest confidence score is placed at the bottom. As another example, any candidate translations that have confidence scores below a particular (e.g., pre-defined) confidence threshold are not displayed to a target user.

In an embodiment, multiple candidate translations of a profile data item are displayed to a user (e.g., by server system 130 sending the candidate translations over network 120 to client 110 for display). The top N candidate translations may be selected for display, where N is a hard-coded or tunable parameter. The candidate translations may be displayed in response to the user requesting to view the user's (first language) profile or in response to the user requesting to view a second language profile.

In an embodiment, additional information about a candidate translation is displayed adjacent to the candidate translation or is a "click" away (or is displayed in response to a mouse pointer being placed over the candidate translation or an adjacent icon). Examples of additional information include a confidence score or other confidence metric or designation (e.g., "HIGH", "MEDIUM", or "LOW") or a source indicator that indicates a source of where the training data that was used to train the translation model that generated the candidate translation originated. Example sources include Wikipedia, LinkedIn, Facebook, or other (third-party) sources. Thus, a different translation model (that is trained on different training data) may be used to generate each candidate translation.

A variation of a source indicator is an indicator that is based on a number of other users who have the same data item and translated data item in their respective profiles. The other users may be restricted to users in the target user's social network or includes any user in a social graph maintained by a social network provider (e.g., all registered users of LinkedIn). For example, a candidate translation for the job title "Software Engineer" is "la ingeniero de programas." If ten other users (e.g., in the target user's own social network) have "Software Engineer" and "la ingeniero de programas" in their respective profiles, then it is more likely that "la ingeniero de programas" is a good translation for "Software Engineer" and the number '10' or other number or icon based on '10' is displayed to the user. Additionally, if other users have edited machine-generated translations (presented to them regarding their respective profiles) to indicate an association between "Software Engineer" and "la ingeniero de programas" (regardless of which is the "target" language to those users), then that information is used to generate the source indicator.

Leveraging User Context to Translate a Profile

In an embodiment, user context is used to modify one or more data items in the user's profile before translating the one or more data items. Examples of user context include other data items in the user's profile, data (e.g., private data that is not viewable by other users in the social network) in an account of the user, and data about a computing device of the user, which device is used to connect to and send requests to server system 130.

For example, an organization (e.g. company) name or job title in a user's profile may be spelled incorrectly. Therefore, translator 132 may not come up with any candidate translations for the specified company name. Prior to or subsequent to determining that a company name is misspelled, an email address of the user is detected in an account of the user. The email address may not be public such that other users (even users who are connected to the user in a social network) are unable to view the email address. Nevertheless, server system 130 compares the domain portion of the email address (e.g., "genentech") to the company name in the user profile (e.g., "Genntech"). If the edit distance between two is less than a particular threshold (e.g., less than a four character edit distance), then the company name is modified based on the domain portion of the email address and the modified company name is then translated. If the company name also appears in a work summary portion of the user's profile, then it is more likely that the domain portion of the email address is accurate.

As another example, in response to determining that a user's job title does not translate well (e.g., only translations with relatively low confidence scores) or that the job title is not recognized in a dictionary of known job titles or even known words in the language of the profile, then the job title is compared to a list of known job titles and the job title that has the lowest edit distance with the user's job title (and, optionally, where the edit distance is less than a particular threshold) is selected. The list may be a list of all known job titles or a list of known job titles that are associated with the company that is specified in the user's profile. Such lists may be created by analyzing many user profiles that are stored and maintained by server system 130.

As another example, after determining that a company name in a user's profile does not translate well (e.g., only translations with relatively low confidence scores), an IP address of a computing device of the user is determined. Based on the IP address, a geographical location or region is determined. A list of known companies in that geographical location/region are determined. The company name in the user's profile is compared to one or more companies in the list. If the company name is a near match to a company name in the list, then the company name in the list is used to perform a translation.

As another example in the scenario where a company name is misspelled, a job title or industry name is extracted from a user's profile. A list of companies that are associated with the job title or industry are identified and then compared to a company name in the user's profile. If the edit distance between a company name in the list and the company name in the profile is small, then the company name in the list is used to perform a translation of the company name.

In a related embodiment, if a company name is selected from a list as a result of a predicted misspelling, then one or more criteria are used to verify that the selected company name is accurate. Example criteria include other profile data items. For example, if the selected company name is associated with a set of job titles (from other users of a social network) that includes the job title specified in the user's profile, then it is more likely that the selected company name is accurate. Similarly, as another example, if a known office of the selected company name is relatively near the user's given residence or geographic location determined based on the user's IP address, then it is more likely that the selected company name is accurate.

In an embodiment, a headline is automatically created for a second language profile of a user that only has a first language profile that does not include a headline. A headline may be specified by a user or may be automatically created by a profile manager component of server system 130. The profile manager component may take a job title and a company name that are specified in a user's profile and create a headline for the user's profile. For example, a job title may be Product Manager and a company name may be LinkedIn. Thus, a headline might be "Product Manager at LinkedIn." If a second language profile for the user is Spanish, then the headline "Gerente de Producto a LinkedIn" may be automatically generated even though the first language profile of the user does not have a headline.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
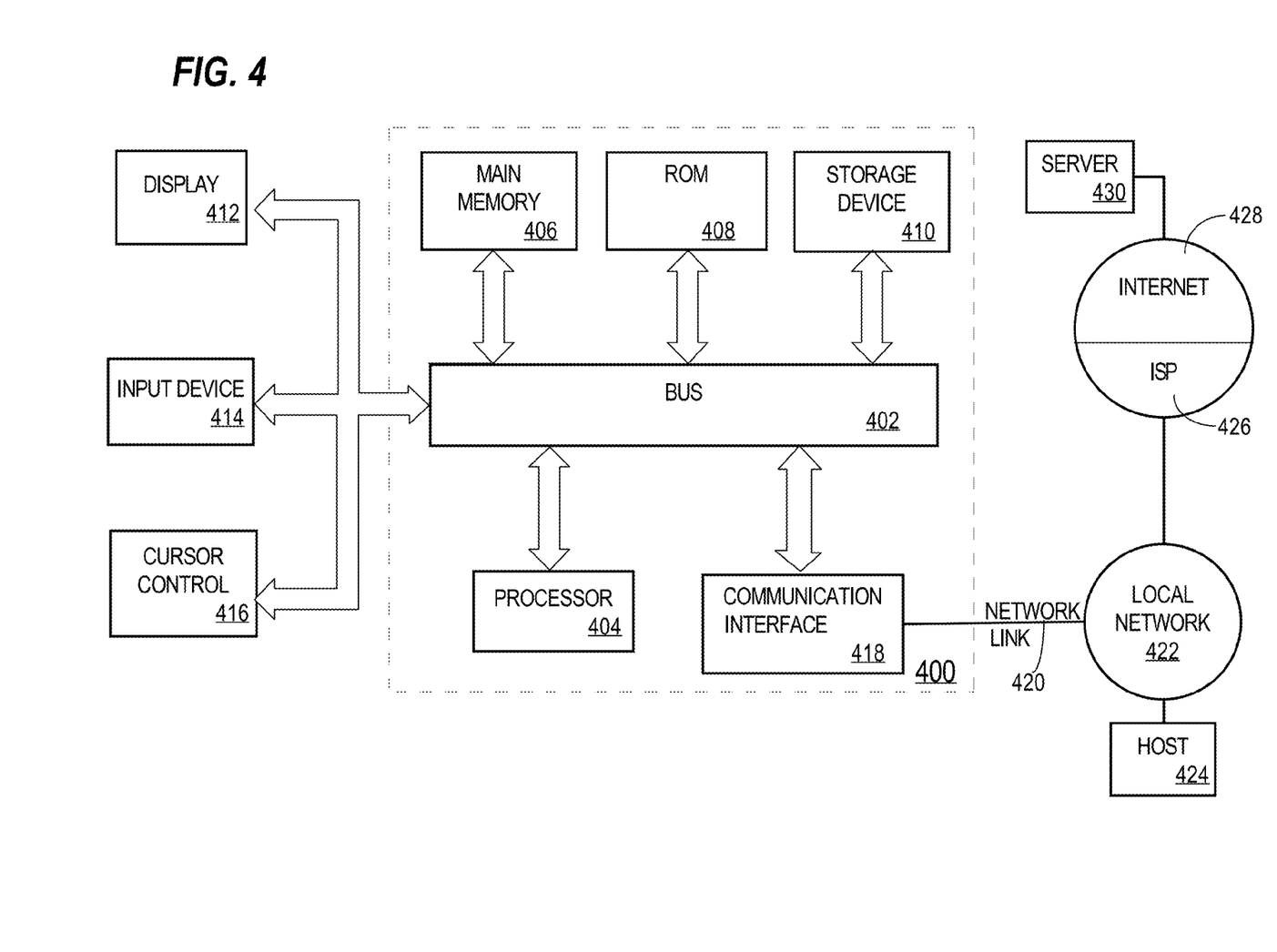
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a plurality of profiles, wherein each profile of the plurality of profiles comprises multiple data items about a different user of a plurality of users;
    identifying a first profile of a first user in the plurality of users, wherein the first profile is in the plurality of profiles, is in a first language, and comprises a plurality of data items about the first user;
    translating a first data item in the plurality of data items into a plurality of translated data items that are in a second language that is different than the first language;
    for each translated data item in the plurality of translated data items, determining how often said each translated data item appears with the first data item in the plurality of profiles;
    selecting, based on a number of user profiles that contain at least one of plurality of translated data items and the first data item, a first translated data item from among the plurality of translated data items;
    storing the first translated first data item in a second language profile of the first user;
    causing the second language profile to be displayed to a second user that is different than the first user;
    wherein the method is performed by one or more computing devices.

2. The method of claim 1, wherein:
    translating the first data item comprises translating each data item in the plurality of data items into a different translated data item of a translated plurality of data items that are in the second language;

causing the second language profile to be displayed comprises causing the plurality of translated data items to be displayed concurrently.

3. The method of claim 1, further comprising, prior to causing the second language profile to be displayed to the second user:
receiving, from the computing device associated with the first user, a request to view the first profile;
after receiving the request, causing the first profile and the first translated data item to be displayed to the first user.

4. The method of claim 3, further comprising, prior to causing the second language profile to be displayed to the second user:
receiving, from the computing device associated with the first user, first input that indicates whether to retain the first translated data item as a data item in the second language profile.

5. The method of claim 1, wherein:
the plurality of profiles includes a second profile that is different than the first profile,
the second profile is about a third user in the plurality of users,
the second profile includes a second plurality of data items that includes a particular data item,
the second plurality of data items are in the first language;
the method further comprising:
translating the particular data item into a second plurality of translated data items that includes a particular translated data item and a second translated data item that is different than the particular translated data item;
causing the second plurality of translated data items to be displayed concurrently;
receiving first input that selects the particular translated data item from among the second plurality of translated data items;
in response to receiving the first input, including the particular translated data item in a second language profile for the third user.

6. The method of claim 5, wherein causing the second plurality of translated data items to be displayed concurrently comprises:
for the particular translated data item, causing an identification of a first source of the particular translated data item to be displayed;
for the second translated data item, causing an identification of a second source of the second translated data item to be displayed, wherein the first source is different than the second source.

7. The method of claim 5, further comprising:
for each translated data item in the second plurality of translated data items, generating a confidence score;
determining an order of the second plurality of translated data items based on confidence scores associated with the second plurality of translated data items;
wherein causing the second plurality of translated data items to be displayed concurrently comprises causing the second plurality of translated data items to be displayed according to the order.

8. The method of claim 5, further comprising:
receiving second input that classifies a translated data item in the second plurality of translated data items as a type of translation that is incorrect;
updating a machine translation model or a classifier based on the second input.

9. The method of claim 1, wherein the first data item and the first translated data item correspond to a job title of the first user, a name of an employer of the first user, a headline of the first user, a skill of the first user, a work summary of the first user, or an interest or hobby of the first user.

10. The method of claim 1, wherein the first user provided particular input that specified each data item in the plurality of data items.

11. The method of claim 1, wherein:
the plurality of profiles includes a second profile that is different than the first profile,
the second profile is about a third user in the plurality of users,
the second profile includes a second plurality of data items that includes a first particular data item,
the second plurality of data items are in the first language,
the method further comprising:
receiving, from a fourth user that is connected to the third user in a social network, first input that indicates a particular translated data item that corresponds to the first particular data item and that is in a third language that is different than the first language;
after receiving the first input, causing the first particular translated data item to be displayed to the third user;
receiving, from the third user, second input that accepts the first particular translated data item;
in response to receiving the second input, storing the first particular translated data item in a particular language profile that is in the third language.

12. The method of claim 11, further comprising, prior to receiving the first input:
using a machine translation model to determine the first particular translated data item;
causing the first particular translated data item to be displayed to the fourth user;
wherein the first input is a selection, by the fourth user, of the first particular translated data item.

13. The method of claim 11, wherein the fourth user specifies the first particular translated data item through text input or voice input.

14. The method of claim 11, further comprising, prior to receiving the first input:
determining, based on one or more criteria, the fourth user from among a plurality of users who are connected to the third user in the social network;
causing, to be displayed to the fourth user, a message that indicates that the third user has a profile that can be translated based on input from the fourth user.

15. The method of claim 11, further comprising, prior to receiving the first input:
receiving third input that the third user specifies and that indicates the fourth user;
in response to receiving the third input, causing, to be displayed to the fourth user, a message that indicates that the third user has a profile that can be translated based on input from the fourth user.

16. The method of claim 1, wherein the plurality of profiles includes a second profile that is different than the first profile, is about a third user in the plurality of users, and includes a second plurality of data items that are in the first language, the method further comprising:
based on particular data that is associated with the third user, modifying a first particular data item, in the second plurality of data items, to generate a modified data item;
wherein the particular data is different than the first particular data item;

translating the modified data item into a particular translated data item.

17. The method of claim 16, wherein the particular data is a second data item, in the second plurality of data items, that is different than the first particular data item.

18. The method of claim 17, wherein the second data item is a job title in the second profile or text within a summary of the second profile.

19. The method of claim 16, wherein the particular data is an IP address or an email address that is associated with the third user.

20. The method of claim 1, further comprising:
storing a plurality of language-specific profiles for a particular user, wherein each language-specific profile of the plurality of language-specific profiles comprises multiple data items about the particular user;
wherein each language-specific profile in the plurality of language-specific profiles is in a language that is different than the language of each other language-specific profile in the plurality of language-specific profiles;
receiving a request that is initiated by a third user that is different than the particular user, wherein the request is for a profile of the particular user;
in response to receiving the request:
determining a particular language that is associated with the third user;
determining whether the particular language matches a language associated with one of the plurality of language-specific profiles;
in response to determining that the particular language matches a language associated with a particular language-specific profile of the plurality of language-specific profiles, causing the particular language-specific profile to be displayed to the third user.

21. A method comprising:
storing a plurality of profiles, wherein each profile of the plurality of profiles comprises multiple data items about a different user of a plurality of users;
identifying a first profile of a first user, wherein the first profile is in the plurality of profiles, is in a first language, and comprises a plurality of data items about the first user;
translating a first data item in the plurality of data items into a first translated data item that is in a second language that is different than the first language;
storing the first translated first data item in the second language profile of the first user;
receiving, from the computing device associated with the first user, a request to view the first profile;
after receiving the request, causing the first translated data item to be displayed to the first user;
receiving, from the computing device associated with the first user, first input that indicates whether to retain the first translated data item as a data item in the second language profile;
wherein the first input indicates that the first translated data item is to be retained as a data item in the second language profile;
in response to receiving the first input, updating a machine translation model that associates the first data item with the first translated data item;
causing the second language profile to be displayed to a second user that is different than the first user;
wherein the method is performed by one or more computing devices.

* * * * *